(12) United States Patent  (10) Patent No.: US 8,512,583 B2
Bonhote et al.  (45) Date of Patent: Aug. 20, 2013

(54) METHOD USING BLOCK COPOLYMERS AND A HARD ELECTROPLATED MASK FOR MAKING A MASTER DISK FOR NANOIMPRINTING PATTERNED MAGNETIC RECORDING DISKS

(75) Inventors: Christian Rene' Bonhote, San Jose, CA (US); Jeffrey S. Lille, Sunnyvale, CA (US); Ricardo Ruiz, Santa Clara, CA (US); Georges Gibran Siddiqi, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 10 days.

(21) Appl. No.: 13/236,484

(22) Filed: Sep. 19, 2011

(65) Prior Publication Data

US 2013/0068719 A1    Mar. 21, 2013

(51) Int. Cl.
*B44C 1/22*    (2006.01)

(52) U.S. Cl.
USPC ............ 216/41; 216/22; 216/40; 216/75; 438/736

(58) Field of Classification Search
USPC ........... 216/25, 26, 41, 48, 49, 72, 75, 100, 216/22; 438/717, 736, 737, 742
See application file for complete search history.

(56) References Cited

U.S. PATENT DOCUMENTS

| 7,341,825 | B2 | 3/2008 | Bandic et al. | |
| 7,520,742 | B2* | 4/2009 | Motowaki et al. | 425/385 |
| 7,976,715 | B2 | 7/2011 | Dobisz et al. | |
| 2002/0166468 | A1* | 11/2002 | Schmid et al. | 101/127 |
| 2006/0124467 | A1 | 6/2006 | Ho et al. | |
| 2009/0311363 | A1* | 12/2009 | Dobisz et al. | 425/470 |
| 2010/0102029 | A1 | 4/2010 | Schmid et al. | |
| 2011/0075288 | A1* | 3/2011 | Krichevsky et al. | 360/31 |

OTHER PUBLICATIONS

Vargas Ilona, L.D. and Jansen, H.V. and Elwenspoek, M.C., "Direct Electroplating on Highly Doped Patterned Silicon Wafers", 16th MicroMechanics Europe Workshop, MME 2005, Sep. 4-6, 2005, Goteborg, Sweden.

Nagase et al., "Resist Properties of Thin Poly(methyl methacrylate) and Polystyrene Films Patterned by Thermal Nanoimprint Lithography for Au Electrodeposilion", Japanese Journal of Applied Physics 49 (2010) 06GL05.

* cited by examiner

*Primary Examiner* — Lan Vinh
(74) *Attorney, Agent, or Firm* — Thomas R. Berthold

(57) ABSTRACT

A method for making a master disk to be used in the nanoimprinting process to make patterned-media disks uses an electrically conductive substrate and guided self-assembly of a block copolymer to form patterns of generally radial lines and/or generally concentric rings of one of the block copolymer components. A metal is electroplated onto the substrate in the regions not protected by the lines and/or rings. After removal of the block copolymer component, the remaining metal pattern is used as an etch mask to fabricate either the final master disk or two separate molds that are then used to fabricate the master disk.

22 Claims, 10 Drawing Sheets

METHOD USING BLOCK COPOLYMERS AND A HARD ELECTROPLATED MASK FOR MAKING A MASTER DISK FOR NANOIMPRINTING PATTERNED MAGNETIC RECORDING DISKS

BACKGROUND OF THE INVENTION

1. Field of the Invention

This invention relates generally to patterned-media magnetic recording disks, wherein each data bit is stored in a magnetically isolated data island on the disk, and more particularly to a method for making a master disk to be used for nanoimprinting the patterned-media disks.

2. Description of the Related Art

Magnetic recording hard disk drives with patterned magnetic recording media have been proposed to increase data density. In patterned media, the magnetic recording layer on the disk is patterned into small isolated data islands arranged in concentric data tracks. To produce the required magnetic isolation of the patterned data islands, the magnetic moment of spaces between the islands must be destroyed or substantially reduced to render these spaces essentially nonmagnetic. In one type of patterned media, the data islands are elevated regions or pillars that extend above "trenches" and magnetic material covers both the pillars and the trenches, with the magnetic material in the trenches being rendered nonmagnetic, typically by "poisoning" with a material like silicon (Si). In another type of patterned media, the magnetic material is deposited first on a flat disk substrate. The magnetic data islands are then formed by milling, etching or ion-bombarding of the area surrounding the data islands. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer.

One proposed method for fabricating patterned-media disks is by nanoimprinting with a template or disk, sometimes also called a "stamper", that has a topographic surface pattern. In this method the magnetic recording disk substrate with a polymer film on its surface is pressed against the template. The polymer film receives the reverse image of the template pattern and then becomes a mask for subsequent etching of the disk substrate to form the pillars on the disk. In one type of patterned media, the magnetic layer and other layers needed for the magnetic recording disk are then deposited onto the etched disk substrate and the tops of the pillars to form the patterned-media disk. In another type of patterned media, the magnetic layers and other layers needed for the magnetic recording disk are first deposited on the flat disk substrate. The polymer film used with nanoimprinting is then pressed on top of these layers. The polymer film receives the reverse image of the template pattern and then becomes a mask for subsequent milling, etching or ion-bombarding the underlying layers. The template may be a master disk for directly imprinting the disks. However, the more likely approach is to fabricate a master disk with a pattern of pillars corresponding to the pattern of pillars desired for the disks and to use this master disk to fabricate replica templates. The replica templates will thus have a pattern of recesses or holes corresponding to the pattern of pillars on the master disk. The replica templates are then used to directly imprint the disks. Nanoimprinting of patterned media is described by Bandic et al., "Patterned magnetic media: impact of nanoscale patterning on hard disk drives", *Solid State Technology* S7+ *Suppl. S, SEP* 2006; and by Terris et al., "TOPICAL REVIEW: Nanofabricated and self-assembled magnetic structures as data storage media", *J. Phys. D: Appl. Phys.* 38 (2005) R199-R222.

In patterned media, the bit-aspect-ratio (BAR) of the pattern or array of discrete data islands arranged in concentric tracks is the ratio of track spacing or pitch in the radial or cross-track direction to the island spacing or pitch in the circumferential or along-the-track direction. This is the same as the ratio of linear island density in bits per inch (BPI) in the along-the-track direction to the track density in tracks per inch (TPI) in the cross-track direction. The BAR is also equal to the ratio of the radial dimension of the bit cell to the circumferential dimension of the bit cell, where the data island is located within the bit cell. The bit cell includes not only the magnetic data island but also one-half of the nonmagnetic space between the data island and its immediately adjacent data islands. The data islands have a ratio of radial length to circumferential width, referred to as the island aspect ratio (IAR), that can be close to or greater than the BAR.

The making of the master template or disk is a difficult and challenging process. The use of electron beam (e-beam) lithography using a Gaussian beam rotary-stage e-beam writer is viewed as a possible method to make a master disk capable of nanoimprinting patterned-media disks with a BAR of about 1 with a track pitch (island-to-island spacing in the radial or cross-track direction) of about 35 nm, and an island pitch (island-to-island spacing in the circumferential or along-the-track direction) of about 35 nm. If the data islands have a radial length and circumferential width each of about 20 nm for an IAR of 1, then these dimensions generally limit the areal bit density of patterned-media disks to about 500 Gbit/in$^2$. To achieve patterned-media disks with both an ultra-high areal bit density (greater than 1 Terabits/in$^2$), a track pitch and an island pitch of about 20 nm will be required. However, a master disk capable of nanoimprinting patterned-media disks with these small dimensions over an area equal to the data area of a disk is not achievable with the resolution of e-beam lithography.

Directed self-assembly of block copolymers has also been proposed for making the master disk and is believed capable of achieving areal bit densities of greater than 1 Terabit/in$^2$. U.S. Pat. No. 7,976,715 B2, assigned to the same assignee as this application, describes the use of directed or guided self-assembly of block copolymers to form a pattern of generally radial lines on a master disk substrate, followed by conventional lithography to form a pattern of concentric rings over the radial lines. After removal of resist and one of the block copolymer components, the substrate has a pattern of pillars of the other block copolymer component, which are then used as an etch mask to etch the substrate.

What is needed is a master disk and a method for making it that can result in patterned-media magnetic recording disks with the required high areal bit density.

SUMMARY OF THE INVENTION

The present invention relates to a method for making a master disk that is used in the nanoimprinting process to make patterned-media disks with track pitch and an island pitch difficult to achieve with the resolution of e-beam lithography. The master disk may be used to directly nanoimprint the disks, but more likely is used to make replica templates which are then used to directly nanoimprint the disks.

In one implementation of the invention, two separate molds are made. Each mold is made using an electrically conductive substrate, like heavily doped silicon. For a first mold, guided self-assembly of block copolymers results in a pattern of radial lines on the substrate. The substrate is then electroplated to form a pattern of metal lines which are used as an etch mask to etch the substrate. The metal lines are removed, leaving the etched substrate as the first mold with radial lines. An identical method is used to make a second mold with circumferential rings. The master disk substrate is covered with a protective layer and a resist layer. The first mold is impressed on the resist layer, and the resulting resist pattern is used as an etch mask to etch away the protective layer not covered by the resist, leaving strips of resist and underlying protective layer corresponding to the pattern of the first mold. The remaining resist strips are removed by a dry or wet process. The substrate with the remaining protective layer strips is then coated again with a resist layer. The second mold is then impressed, generating strips of resist with the grooves of the second mold intersecting the strips formed in the first pattern. The resulting resist pattern is used as an etch mask to etch away remaining portions of the protective layer not covered by the resist. After etching the exposed portions of the protective layer, the remaining resist strips are removed by a wet or dry process, leaving pillars of underlying protective layer. The pillars then serve as an etch mask for an etching process that etches unprotected portions of the master disk substrate. The resulting master disk then has pillars in the substrate in a pattern of concentric rings and generally radial lines. Alternatively, after the second imprint, the resulting resist pattern is used as a lift-off mask. After the second imprint, a thin layer of a material equal or similar to the protective layer is deposited on top of the resist strips and in the exposed portions of the substrate to form new strips of protective layer material that intersect with the strips previously formed on the substrate. The resist coated with protective layer material is then removed by a lift-off process in a suitable solvent or acid. After liftoff, the substrate consists of a grid of protective layer material with exposed rectangular holes. The grid is then used as an etch mask to etch holes into the master template.

In another implementation of the method, conventional or e-beam lithography is used to form a pattern of generally radial stripes on an electrically conductive substrate, preferably a heavily doped silicon substrate, with the stripes being grouped into annular zones or bands. Then a first block copolymer (BCP) material with bulk period $L_0=L_{circ}$, is deposited on the pattern, resulting in guided self-assembly of the first BCP into its components to multiply the generally radial stripes into generally radial lines of alternating first BCP components. The radial lines preferably have a higher circumferential density than that of the radial stripes. The radial lines of one of the components are removed, leaving the radial lines of the remaining component of the first BCP. The substrate is then electroplated and the remaining component of the first BCP removed, leaving a pattern of metal radial lines.

Then a second BCP material with bulk period $L_0=L_{circ}$ is deposited over the metal radial lines to define generally concentric rings. The concentric rings of one of the components of the second BCP are removed, leaving the concentric rings of the remaining component of the second BCP. The resulting structure has a pattern of concentric rings of the remaining second BCP component overlying a pattern of metal radial lines. This structure is then used to make a master disk with either holes or pillars.

For a fuller understanding of the nature and advantages of the present invention, reference should be made to the following detailed description taken together with the accompanying figures.

DETAILED DESCRIPTION OF THE INVENTION

Figure 1:
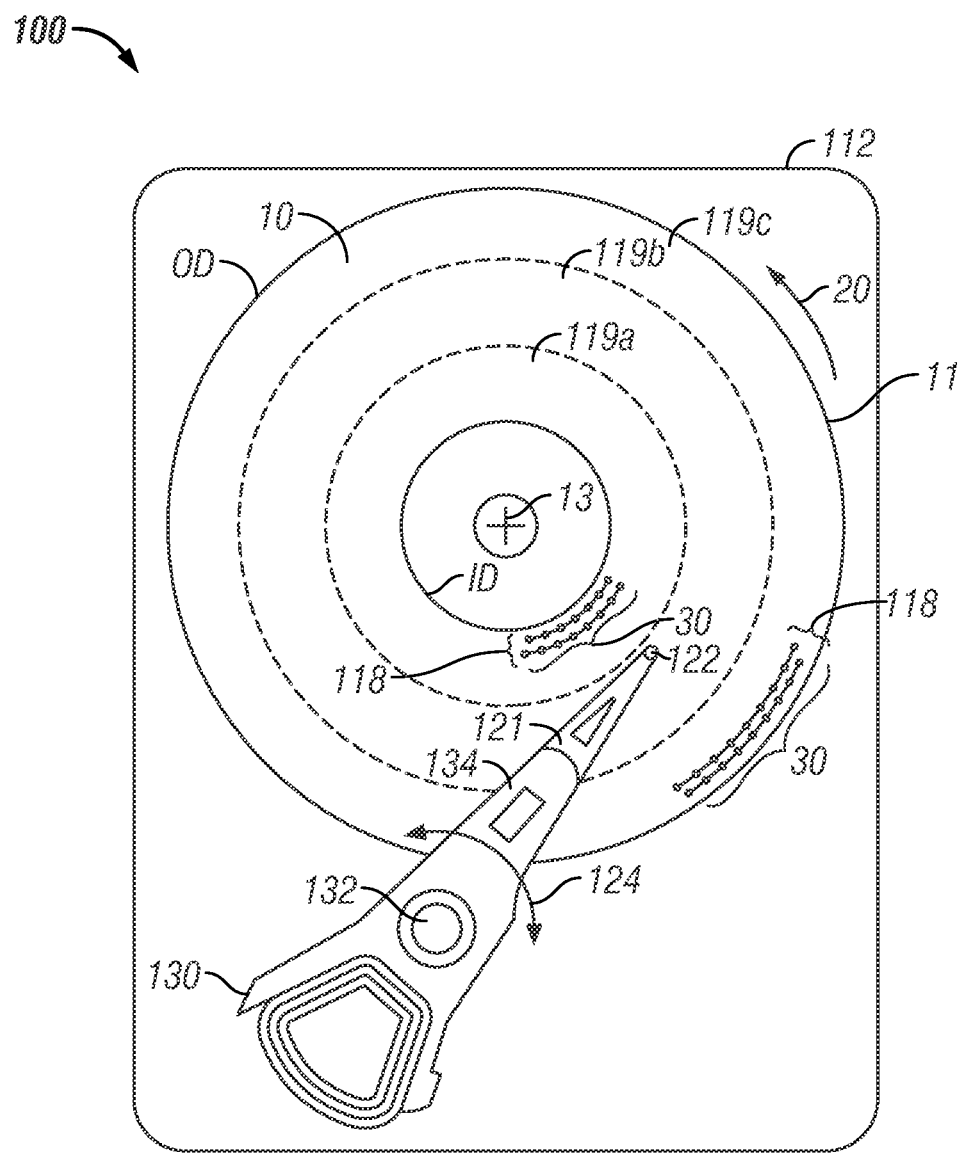
FIG. 1 is a top view of a disk drive with a patterned-media type of magnetic recording disk as described in the prior art.

FIG. 1 is a top view of a disk drive 100 with a patterned magnetic recording disk 10 as described in the prior art. The drive 100 has a housing or base 112 that supports an actuator 130 and a drive motor for rotating the magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A magnetoresistive read head (not shown) and an inductive write head (not shown) are typically formed as an integrated read/write head patterned on the trailing surface of the head carrier 122, as is well known in the art.

The patterned magnetic recording disk 10 includes a disk substrate 11 and discrete data islands 30 of magnetizable material on the substrate 11. The data islands 30 function as discrete magnetic bits for the storage of data and are arranged in radially-spaced circular tracks 118, with the tracks 118 being grouped into annular bands 119a, 119b, 119c. The grouping of the data tracks into annular zones or bands permits banded recording, wherein the angular spacing of the data islands, and thus the data rate, is different in each band. In FIG. 1, only a few islands 30 and representative tracks 118 are shown in the inner band 119a and the outer band 119c. As the disk 10 rotates about its center 13 in the direction of arrow 20, the movement of actuator 130 allows the read/write head on the trailing end of head carrier 122 to access different data tracks 118 on disk 10. Rotation of the actuator 130 about pivot 132 to cause the read/write head on the trailing end of head carrier 122 to move from near the disk inside diameter (ID) to near the disk outside diameter (OD) will result in the read/write head making an arcuate path across the disk 10.

Figure 2:
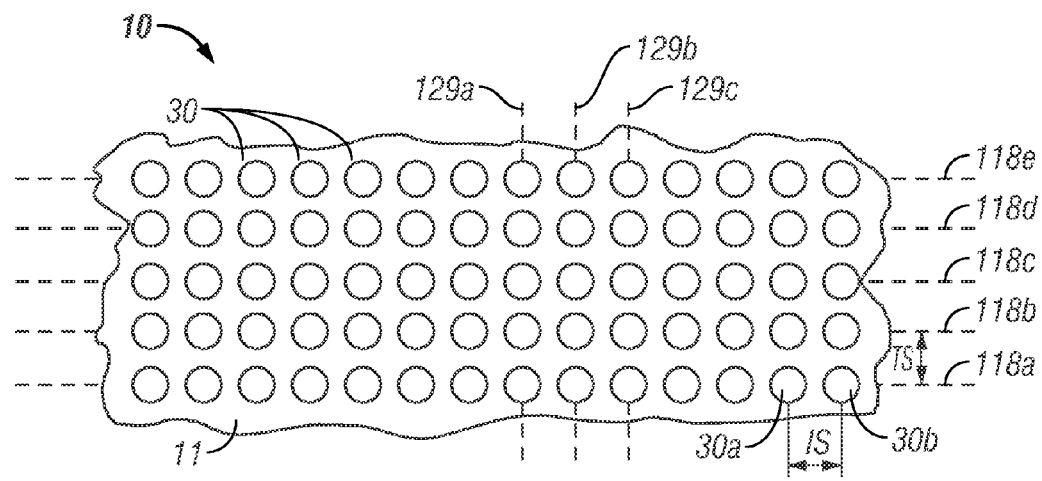
FIG. 2 is a top view of an enlarged portion of a patterned-media type of magnetic recording disk showing the detailed arrangement of the data islands in one of the bands on the surface of the disk substrate.

FIG. 2 is a top view of an enlarged portion of disk 10 showing the detailed arrangement of the data islands 30 in one of the bands on the surface of disk substrate 11 according to the prior art. While the islands 30 are shown as being circularly shaped, they may have other shapes, such as generally rectangularly or generally elliptical. The islands 30 contain magnetizable recording material and are arranged in tracks spaced-apart in the radial or cross-track direction, as shown by tracks 118a-118e. The tracks are typically spaced apart by a nearly fixed track pitch or spacing TS. Within each track 118a-118e, the islands 30 are roughly equally spaced apart by a nearly fixed along-the-track island pitch or spacing IS, as shown by typical islands 30a, 30b, where IS is the spacing between the centers of two adjacent islands in a track. In FIG. 2, TS and IS are depicted as being equal, so the BAR is 1. The islands 30 are also arranged into generally radial lines, as shown by radial lines 129a, 129b and 129c that extend from disk center 13 (FIG. 1). Because FIG. 2 shows only a very small portion of the disk substrate 11 with only a few of the data islands, the pattern of islands 30 appears to be two sets of perpendicular lines. However, tracks 118a-118e are concentric rings centered about the center 13 of disk 10 and the lines 129a, 129b, 129c are not parallel lines, but radial lines extending from the center 13 of disk 10. Thus the angular spacing between adjacent islands as measured from the center 13 of the disk for adjacent islands in lines 129a and 129b in a radially inner track (like track 118e) is the same as the angular spacing for adjacent islands in lines 129a and 129b in a radially outer track (like track 118a).

The generally radial lines (like lines 129a, 129b, 129c) may be perfectly straight radial lines but are preferably arcs or arcuate-shaped radial lines that replicate the arcuate path of the read/write head on the rotary actuator. Such arcuate-shaped radial lines provide a constant phase position of the data islands as the head sweeps across the data tracks. There is a very small radial offset between the read head and the write head, so that the synchronization field used for writing on a track is actually read from a different track. If the islands between the two tracks are in phase, which is the case if the radial lines are arcuate-shaped, then writing is greatly simplified.

Figure 3:
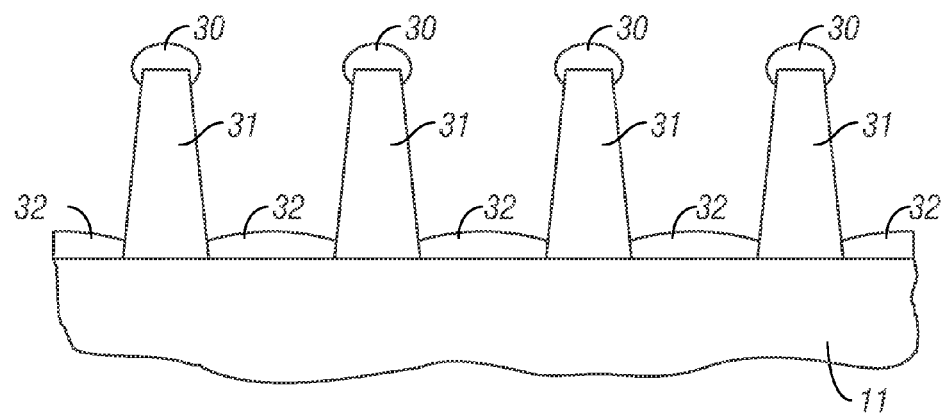
FIG. 3 is a side sectional view of one type of a patterned-media disk showing the data islands as elevated, spaced-apart pillars that extend above the disk substrate surface with trenches between the pillars.

Patterned-media disks like that shown in FIG. 2 may be longitudinal magnetic recording disks, wherein the magnetization directions in the magnetizable recording material are parallel to or in the plane of the recording layer in the islands, or perpendicular magnetic recording disks, wherein the magnetization directions are perpendicular to or out-of-the-plane of the recording layer in the islands. To produce the required magnetic isolation of the patterned data islands, the magnetic moment of the regions between the islands must be destroyed or substantially reduced to render these spaces essentially nonmagnetic. Patterned media may be fabricated by any of several known techniques. In one type of patterned media, the data islands are elevated, spaced-apart pillars that extend above the disk substrate surface to define troughs or trenches on the substrate surface between the pillars. This type of patterned media is shown in the sectional view in FIG. 3. In this type of patterned media the substrate 11 with a pre-etched pattern of pillars 31 and trenches or regions between the pillars can be produced with relatively low-cost, high volume nanoimprinting process using a master template or disk. The magnetic recording layer material is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material may be spaced far enough from the read/write head to not adversely affect reading or writing to the recording layer material in islands 30, or the trenches may be rendered nonmagnetic by "poisoning" with a material like Si. This type of patterned media is described by Moritz et al., "Patterned Media Made From Pre-Etched Wafers: A Promising Route Toward Ultra-high-Density Magnetic Recording", IEEE Transactions on Magnetics, Vol. 38, No. 4, July 2002, pp. 1731-1736.

Figure 4:
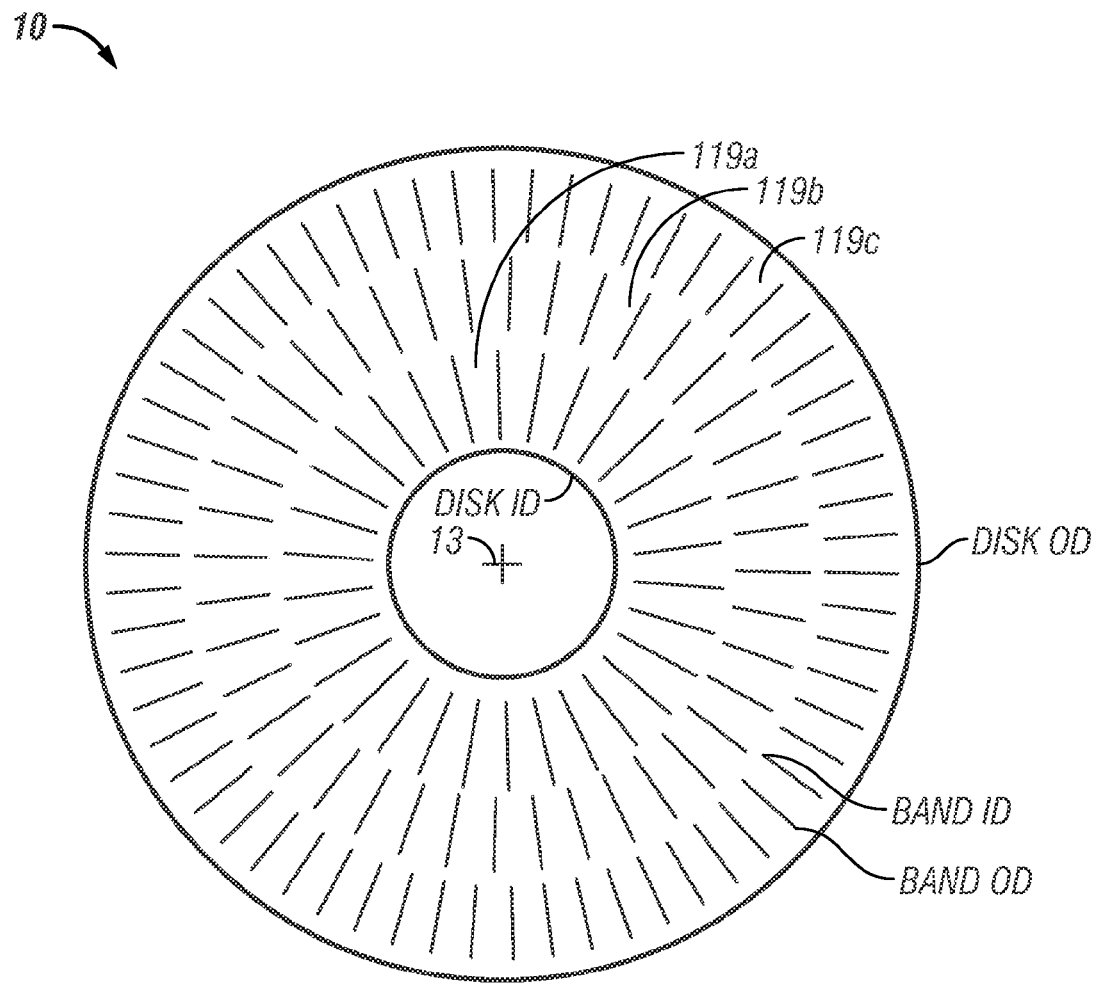
FIG. 4 is a schematic view of a patterned-media disk showing a pattern of radial lines in three annular bands, with each radial line meant to represent data islands from all the concentric tracks in the band.

FIG. 4 is a schematic view of patterned-media disk 10 showing a pattern of generally radial lines in three annular bands 119a-119c. Each radial line is meant to represent data islands from all the concentric tracks in the band. The circumferential density of the radial lines is similar in all three bands, with the angular spacing of the lines being adjusted in the bands to have smaller angular spacing in the direction from the disk inside diameter (ID) to outside diameter (OD), so that the circumferential density of the radial lines, and thus the "linear" or along-the-track density of data islands, stays relatively constant over all the bands on the disk. In actuality, a typical disk is divided into about 20 annular bands, which allows the linear density to remain constant to within a few percent across all bands. Within each band, the radial lines are subdivided (not shown) into very short radial segments or lengths arranged in concentric rings, with each ring being a data track and each radial segment or length being a discrete data island. Each annular band, like band 119c, has a band ID and a band OD. Also, in actuality the generally radial lines are more typically generally arcuate lines that replicate the path of the read/write head mounted on the end of the rotary actuator.

The making of the master template or disk to achieve an ultrahigh density patterned-media disk is a difficult and challenging process. The use of electron beam (e-beam) lithography using a Gaussian beam rotary-stage e-beam writer is viewed as a possible method to make a master disk capable of nanoimprinting patterned-media disks with a BAR of about 1 with a track pitch (island-to-island spacing in the radial or cross-track direction) of about 35 nm, and an island pitch (island-to-island spacing in the circumferential or along-the-track direction) of about 35 nm. If the data islands have a radial length and circumferential width each of about 20 nm for an IAR of 1, then these dimensions generally limit the areal bit density of patterned-media disks to about 500 Gbit/$in^2$. To achieve patterned-media disks with both an ultra-high areal bit density (greater than 1 Terabits/$in^2$), a track pitch and an island pitch of about 25 nm will be required. However, a master disk capable of nanoimprinting patterned-media disks with these small dimensions over an area equal to the data area of a disk is not achievable with the resolution of e-beam lithography.

Directed self-assembly of BCPs has also been proposed for making the master disk and is believed capable of achieving areal bit densities of greater than 1 Terabit/$in^2$. U.S. Pat. No. 7,976,715 B2, assigned to the same assignee as this application, describes the use of directed self-assembly of BCPs to form a pattern of generally radial lines on a master disk substrate, followed by conventional lithography to form a pattern of concentric rings over the radial lines. After removal of resist and one of the BCP components, the substrate has a pattern of pillars of the other BCP component, which are then used as an etch mask to etch the substrate. This results in a master disk with pillars of substrate material corresponding to the desired pattern of data islands for the patterned-media disks.

The present invention relates to a method for making a master disk that is used in the nanoimprinting process to make patterned-media disks. The method uses an electrically conductive substrate and guided self-assembly of a BCP to form patterns of generally radial lines and/or generally concentric rings of one of the BCP components. A metal is then electroplated onto the substrate in the regions not protected by the lines and/or rings. After removal of the BCP component, the remaining metal pattern is used as an etch mask to fabricate either the final master disk or two separate molds that are then used to fabricate the master disk.

Self-assembling BCPs have been proposed for creating periodic nanometer (nm) scale features. A self-assembling BCP typically contains two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. There are many types of BCPs that can be used for forming the self-assembled periodic patterns. If one of the components A or B is selectively removable without having to remove the other, then an orderly arranged structural units of the un-removed component can be formed.

Specific examples of suitable BCPs that can be used for forming the self-assembled periodic patterns include, but are not limited to: poly(styrene-block-methyl methacrylate) (PS-b-PMMA), poly(ethylene oxide-block-isoprene) (PEO-b-PI), poly(ethylene oxide-block-butadiene) (PEO-b-PBD), poly(ethylene oxide-block-styrene) (PEO-b-PS), poly(ethylene oxide-block-methylmethacrylate) (PEO-b-PMMA), poly(ethyleneoxide-block-ethylethylene) (PEO-b-PEE), poly(styrene-block-vinylpyridine) (PS-b-PVP), poly(styrene-block-isoprene) (PS-b-PI), poly(styrene-block-butadiene) (PS-b-PBD), poly(styrene-block-ferrocenyldimethylsilane) (PS-b-PFS), poly(butadiene-block-vinylpyridine) (PBD-b-PVP), poly(isoprene-block-methyl methacrylate) (PI-b-PMMA), and poly(styrene-block-dymethylsiloxane) (PS-b-PDMS).

The specific self-assembled periodic patterns formed by the BCP are determined by the molecular volume ratio between the first and second polymeric block components A and B. When the ratio of the molecular volume of the second polymeric block component B over the molecular volume of the first polymeric block component A is less than about 80:20 but greater than about 60:40, the BCP will form an ordered array of cylinders composed of the first polymeric block component A in a matrix composed of the second polymeric block component B. When the ratio of the molecular volume of the first polymeric block component A over the molecular volume of the second polymeric block component B is less than about 60:40 but is greater than about 40:60, the BCP will form alternating lamellae composed of the first and second polymeric block components A and B. In the present invention, the un-removed component is to be used as an etch mask, so ordered arrays of alternating lamellae and alternating cylinders are of interest.

The periodicity or bulk period ($L_0$) of the repeating structural units in the periodic pattern is determined by intrinsic polymeric properties such as the degree of polymerization N and the Flory-Huggins interaction parameter $\chi$. $L_0$ scales with the degree of polymerization N, which in turn correlates with the molecular weight M. Therefore, by adjusting the total molecular weight of the BCP of the present invention, the bulk period ($L_0$) of the repeating structural units can be selected.

To form the self-assembled periodic patterns, the BCP is first dissolved in a suitable solvent system to form a BCP solution, which is then applied onto a surface to form a thin BCP layer, followed by annealing of the thin BCP layer, which causes phase separation between the different polymeric block components contained in the BCP. The solvent system used for dissolving the BCP and forming the BCP solution may comprise any suitable non-polar solvent, including, but not limited to: toluene, propylene glycol monomethyl ether acetate (PGMEA), propylene glycol monomethyl ether (PGME), and acetone. The BCP solution can be applied to the substrate surface by any suitable techniques, including, but not limited to: spin casting, coating, spraying, ink coating, dip coating, etc. Preferably, the BCP solution is spin cast onto the substrate surface to form a thin BCP layer. After application of the thin BCP layer onto the substrate surface, the entire substrate is annealed to effectuate microphase segregation of the different block components contained by the BCP, thereby forming the periodic patterns with repeating structural units.

The BCP films in the above-described techniques self-assemble without any direction or guidance. This undirected self-assembly results in patterns with defects so it is not practical for applications that require long-range ordering, such as for making annular bands of radial lines on a master disk for nanoimprinting patterned-media disks. However, directed or guided self-assembly of a BCP to form patterns of generally radial lines and/or generally concentric rings of one of the BCP components is described in U.S. Pat. No. 7,976,715 B2, assigned to the same assignee as this application.

Figure 5A:
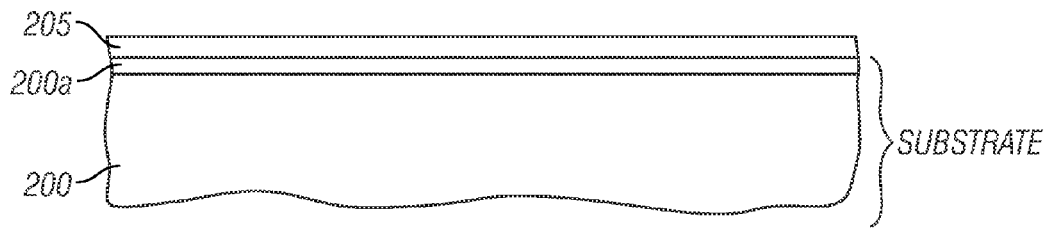
FIGS. 5A-5K are views of a small portion of one annular band of a mold at successive stages of making a mold to be used in making the master disk according to the present invention.
Figure 5B:
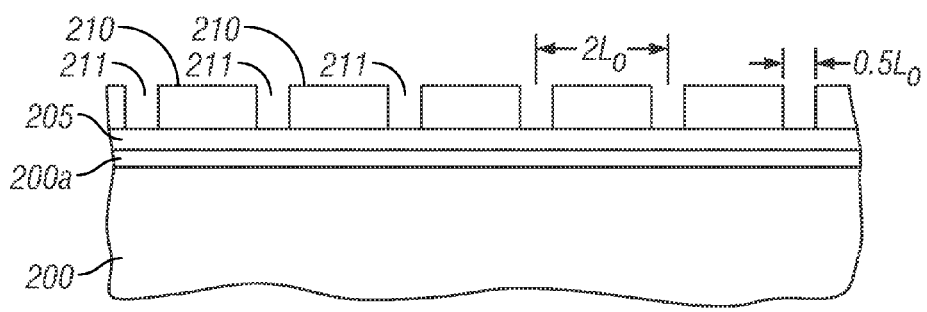

In a first implementation of the invention two separate molds are fabricated, one with generally radial lines and one with generally concentric rings. The two molds are then used to make the master disk. The method for making each mold is explained with respect to FIGS. 5A-5K. FIGS. 5A-5C, 5E-5I and 5K are side sectional views, at various stages of the fabrication method, and FIGS. 5D and 5J are top views at various stages of the method. Referring first to FIG. 5A, the substrate 200 is electrically conductive (or has an electrically conductive surface). The preferred substrate is heavily-doped silicon, such as a single-crystal silicon wafer doped with sufficient boron (B), phosphorus (P), antimony (Sb), and arsenic (As), so as to make the wafer electrically conductive. Such wafers typically have a native surface oxide layer ($SiO_2$) of 2 nm, which is depicted as oxide layer 200a. However, it is possible to remove the native oxide from the wafer surface by etching in a HF solution. It is known that silicon surfaces etched in HF solutions are temporarily resistant to oxidation in air due to surface termination with hydrogen. The electrically conductive substrate may also be a substrate, like a Si wafer, with a thin sputter-deposited metallic film. The metallic film may be any material that is capable of being removed by ion milling or reactive-ion-etching (RIE). If tungsten (W), molybdenum (Mo) or ruthenium (Ru) is used as the metallic film, then these materials can be removed by RIE using conventional fluorine chemistry.

A nearly neutral layer 205 of a material that does not show a strong wetting affinity by one of the polymer blocks over the other, that will be referred to as "neutral layer", is deposited onto the substrate 200. The neutral layer can be, but is not restricted to, a functionalized polymer brush, a cross-linkable polymer, a functionalized polymer "A" or "B" or a functionalized random copolymer "A-r-B". The functional group may be, for example, a hydroxyl group. In the present example, the neutral layer 205 is a hydroxyl-terminated polystyrene brush of lower molecular weight than the BCP used. The brush material is spin-coated on substrate 200 to a thickness of about 1-10 nm (below 6 nm is preferred). The purpose of the neutral layer is to tune the surface energy adequately to promote the desired domain orientation (perpendicular lamellae) and to provide the adequate wetting conditions for density multiplication.

The method will be described in FIGS. 5A to 5K for making a mold with generally radial lines, but the method is identical for making a mold with generally concentric rings. In FIG. 5B a resist layer has been deposited on brush layer 205 and patterned into generally radial bars 210 of resist. The resist may be a positive e-beam resist like poly methyl methacrylate (PMMA) or ZEP520 from Zeon Chemicals, L.P. The resist layer is patterned by e-beam and developed to form the pattern of radial bars 210 separated by radial spaces 211 that expose portions of brush layer 205. The e-beam tool patterns the resist layer so that the radial spaces 211 have a circumferential spacing that is approximately an integer multiple of $L_0$ (i.e., $nL_0$), the known bulk period for the selected BCP that will be subsequently deposited. In FIG. 5B, n is 2. The circumferential width of each radial space 211 is selected to be approximately 0.5 $L_0$.

Figure 5C:
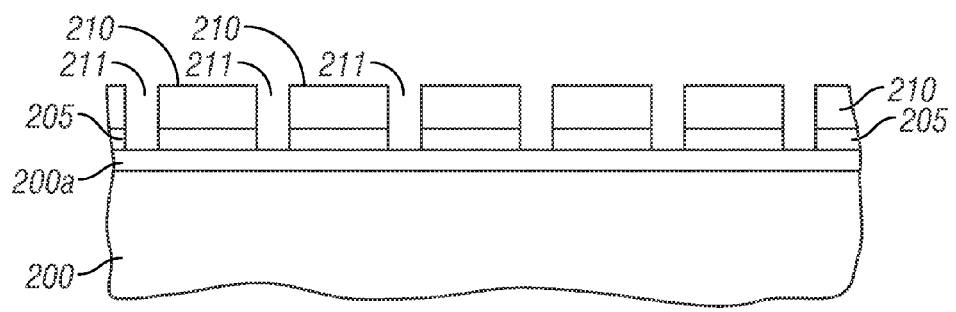
Figure 5D:
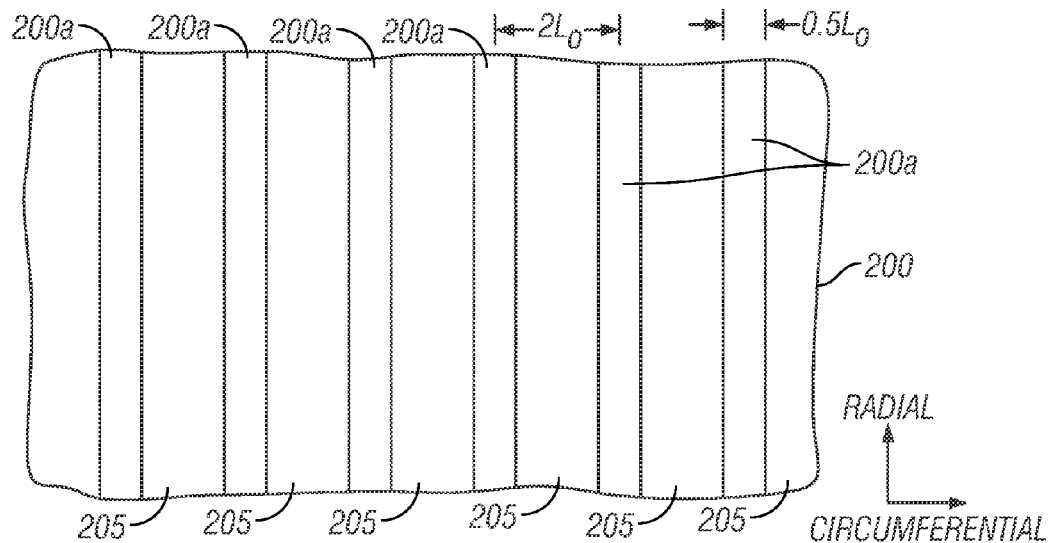

In FIG. 5C, the structure is etched, by a process of oxygen plasma reactive ion etching ($O_2$ RIE), to remove portions of brush layer 205 in the radial spaces 211, which exposes portions of oxide layer 200a. Alternatively, the chemical structure of the exposed portions of brush layer 205 in the radial spaces 211 can be chemically altered (by oxygen plasma etching or other process such as reactive ion etching, neutral atom (such as Ar) or molecule milling, ion bombardment and photodegradation) so that the exposed portions of brush layer 205 have a preferred affinity (or repulsion) for one of the copolymers. In FIG. 5D, which is a top view, the resist 210 is removed, leaving on the substrate 200 a pattern of generally radial bars 205 of polymer brush material separated by generally radial stripes 200a of oxide. In this pattern the generally radial stripes 200a have a circumferential width of 0.5 $L_0$ and a circumferential pitch of 2 $L_0$. Because FIG. 5D is only a very small portion of the master disk, the stripes 200a appear as parallel stripes. However, the stripes 200a are arranged generally radially, as depicted in FIG. 4. The stripes 200a may be perfectly straight radial stripes but are preferably arcs or arcuate-shaped radial stripes that replicate the arcuate path of the read/write head on the rotary actuator.

Figure 5E:
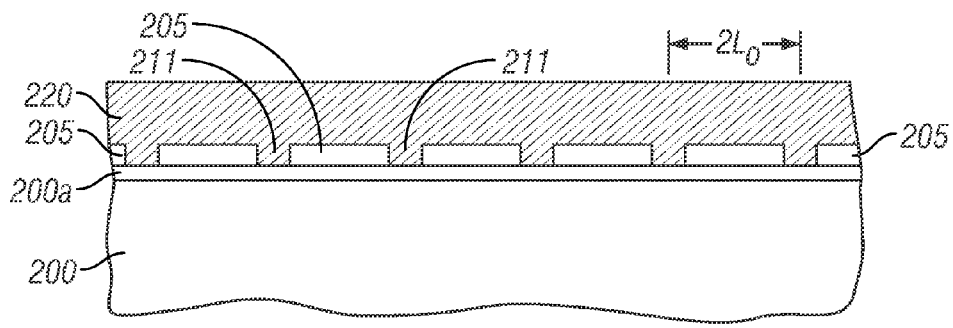

Next, in FIG. 5E, a layer 220 of BCP material is deposited over the radial bars 205 of brush material and the radial stripes 200a in the radial spaces 211. The preferred BCP material is the diblock copolymer polystyrene-block-polymethylmethacrylate (PS-b-PMMA) with $L_0$ between about 8 nm and 30 nm and is deposited by spin coating to a thickness of about 0.5 $L_0$ to 3 $L_0$.

Figure 5F:
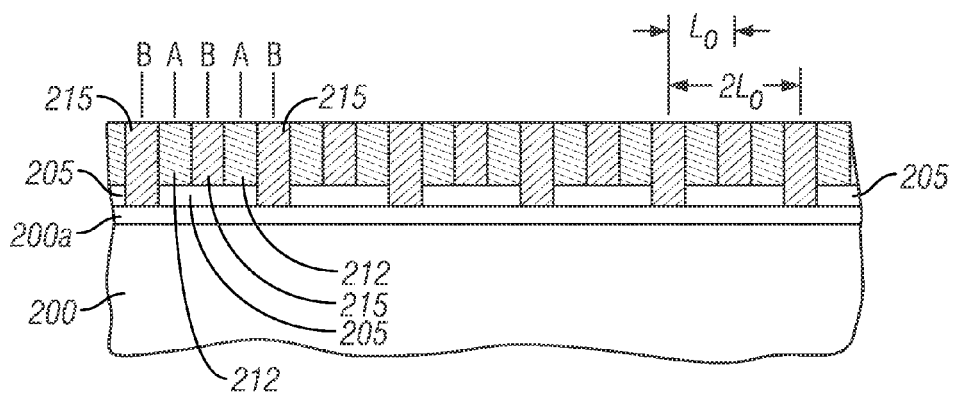

In FIG. 5F, the BCP layer has been annealed, for example by heating to about 250 deg. C. for approximately 60 minutes under nitrogen atmosphere, which results in phase separation between the different components contained in the BCP. In this example, the B component (PMMA) has an affinity for the surface of stripes 200a or for the polar groups of the chemically altered brush 205 and thus form as generally radial lines 215 on top of the radial stripes 200a. Because the circumferential width of the stripes 200a is approximately 0.5 $L_0$, the A component (PS) form in adjacent radial lines 212 on the radial bars 205 of polymer brush material. As a result of the self-assembly of the A and B components this causes the B component to also form as generally radial lines 215 on the centers of each radial bar 205 of polymer brush material. The generally radial stripes 200a thus guide the self-assembly of the PS and PMMA components to form the alternating radial lines 212, 215 in the structure as shown in FIG. 5F. Although the A and B components prefer to self-assemble in parallel lines with a period of $L_0$, the substrate pattern of radial stripes 200a guides the alternating lines 212, 215 to form as radial lines, which means that that $L_0$ cannot be constant over the entire radial length. However, a pattern of alternating radial lines 212, 215 can be accomplished without any significant defects if the variation from $L_0$ does not exceed approximately 10 percent. Thus, to achieve this, the circumferential spacing of the radial stripes 200a at the band ID should not be less than about 0.9 $nL_0$ and the circumferential spacing of the radial stripes 200a at the band OD should not be greater than about 1.1 $nL_0$ (n is an integer where $L_0=L_{rad}$ or $L_0=L_{circ}$).

Alternatively, the BCP can be "annealed" by exposure to vapor that is the same or similar to the non-polar solvent that was used to dissolve the BCP into solution. The exposure to vapor, also called "solvent annealing", will lower the glass transition temperature Tg of the film below room temperature when exposed to the vapor. After the vapor is removed (or purged) the film will be in its final crystalline state.

Figure 5G:
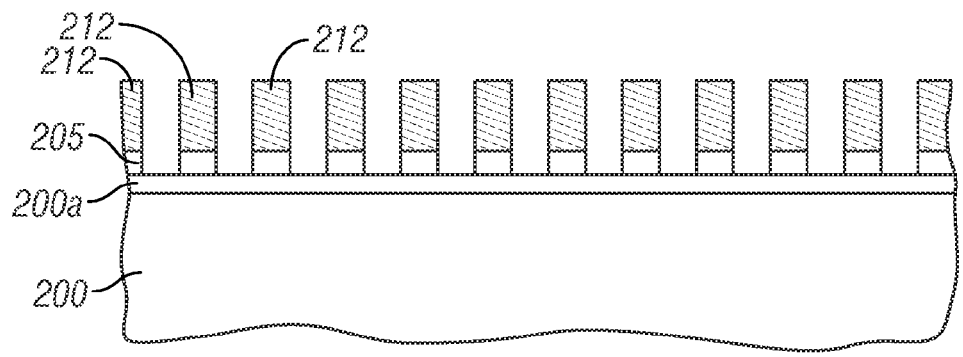
Figure 5H:
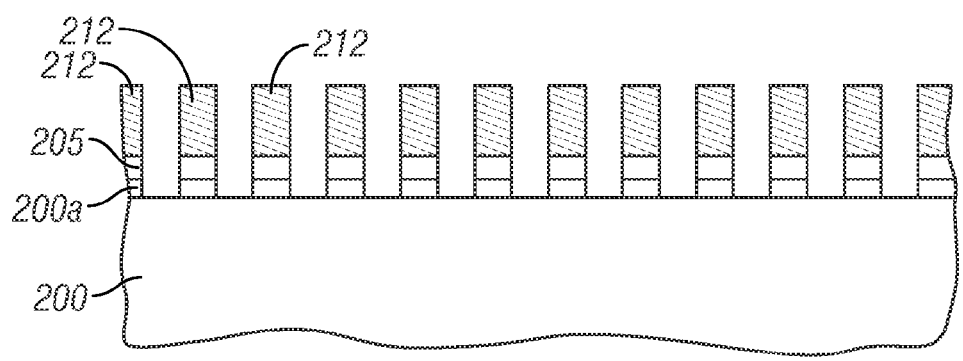

Next, in FIG. 5G, the B component (PMMA) is selectively removed by a wet etch (acetic acid, IPA or other selective solvent) or a dry etch process ($O_2$ RIE), leaving generally radial lines 212 of the A component (PS). If the native oxide layer 200a was not previously removed from the doped silicon substrate 200, then the exposed regions of oxide layer 200a between the radial lines 212 are removed by either a dry etch using a fluorine containing plasma or a wet etch using an HF containing solution, exposing the electrically conductive doped silicon substrate 200 in these regions, resulting in the structure shown in FIG. 5H.

Figure 5I:
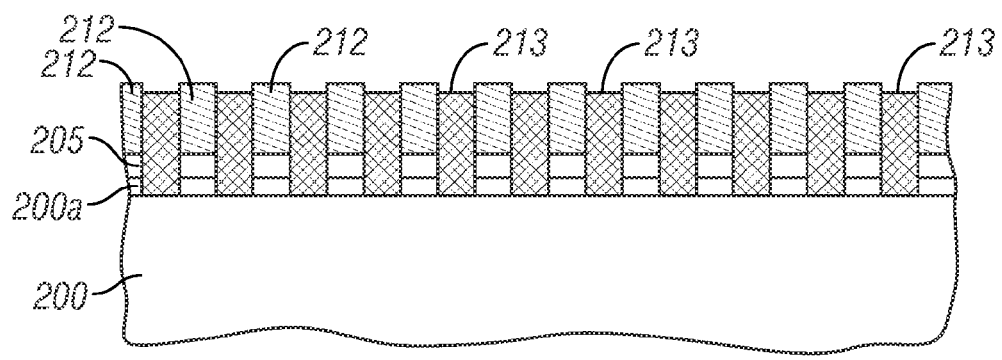
Figure 5J:
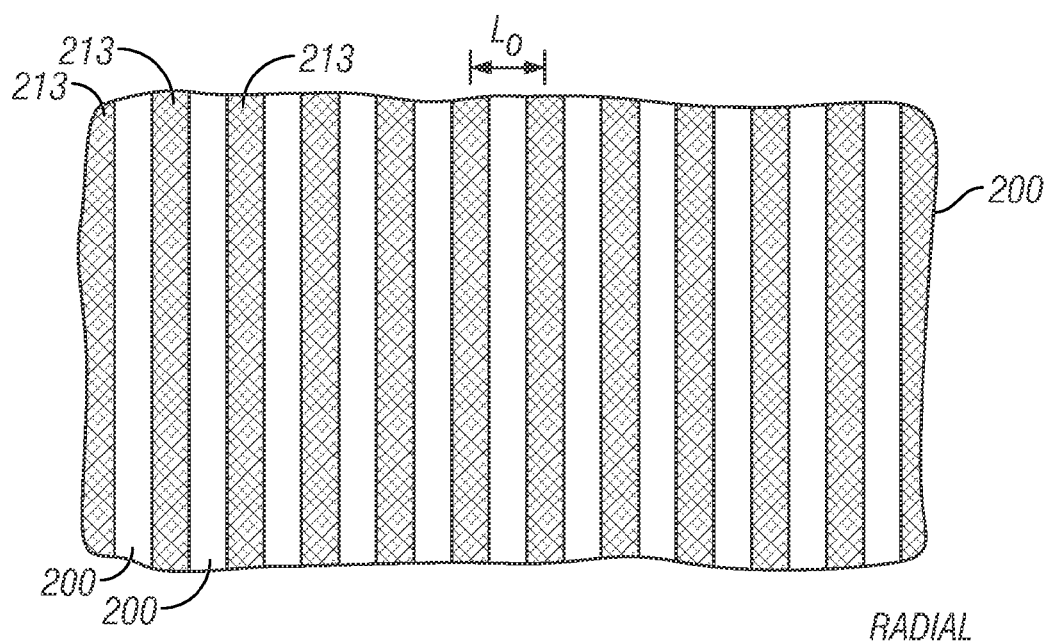

Then in FIG. 5I, the substrate has been placed in an electroplating bath, preferably a Ni plating bath, such as a Watt's bath containing boric acid, nickel sulfates and chlorides and operated at room temperature at a pH of 3.5. As an alternative to Ni, other metals may be electroplated, such as NiP or one or more of Co, Fe, Cr, or Cu or alloys thereof, using well-known plating baths and methods for these metals. This results in radial lines 213 of Ni between the radial lines 212 of the A component. The thickness of the Ni is preferably in the range of 1 nm to 20 nm.

Next, the radial lines 212 of the A component (PS) and the regions of underlying brush layer 205 and oxide 200a are removed by a $O_2$ RIE process or by forming gas RIE or ashing, leaving the radial lines 213 of Ni on substrate 200. The resulting structure is shown in the top view of FIG. 5J, which shows the generally radial metal lines 213 with a circumferential spacing $L_0$. In FIG. 5J the circumferential density of Ni radial lines 213 has been doubled from the circumferential density of radial stripes 200a in FIG. 5D.

The Ni radial lines 213 are then used as an etch mask to etch away unprotected portions of the substrate 200.

Figure 5K:
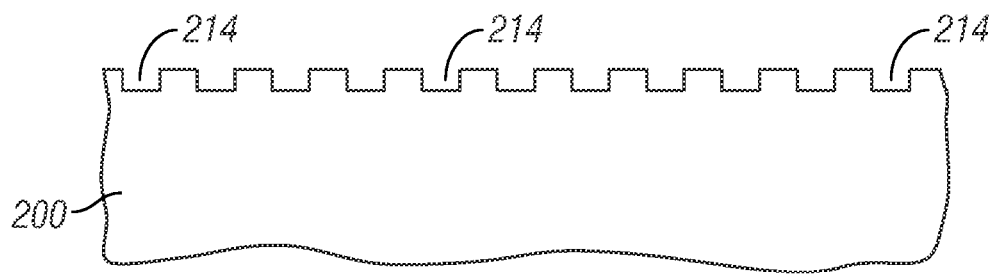

The Ni radial lines are then removed by a wet etch in an acid-containing solution, like nitric acid or piranha etch solutions. FIG. 5K is a sectional view of the resulting etched substrate, showing etched recesses 214 which are arranged as generally radial lines in annular bands which can now function as a first mold to be used to pattern generally radial lines in the making of the master disk.

As an alternative to using the metal (Ni) radial lines 213 (FIG. 5J) as a mask to directly etch the substrate 200, the metal radial lines 213 can be used as a mask to etch the upper layer of a bilayer formed on the substrate 200. In this approach a bilayer is formed on the surface of substrate 200 prior to deposition of neutral layer 205. The bilayer may be a lower layer, for example a Cr, Cr-alloy or $CrN_x$ layer approximately 5 nm thick which will be used as a hard mask to etch the substrate 200, and an upper layer, for example a Si alloy, $SiO_x$ or $SiN_x$ layer approximately 5 nm thick. The etching using the metal lines 213 as the mask etches away the exposed upper layer of the bilayer, exposing the lower layer. After etching and removal of the metal radial lines 213, the resulting structure would appear like that of FIG. 5K, except that the raised portions would be the upper layer, with the lower layer located directly beneath the upper layer. The raised portions of the upper layer are then used as an etch mask to etch away the exposed portions of the lower layer. After removal of the upper layer, a patterned hard mask remains, for example a hard mask of Cr, Cr alloy or CrNx. This hard mask is then used to etch the underlying substrate 200. After removal of the hard mask, the structure would appear as in FIG. 5K. The advantage of using a bilayer to create a hard mask which is then used to etch the underlying substrate 200 is that the upper layer can be patterned with one or more masking steps. The lower layer protects the substrate 200 from the processes used to pattern the upper layer. Once the lower layer is patterned, the substrate 200 may be patterned in one etch step to create features of uniform depth across the substrate 200.

The same process as described above with respect to FIGS. 5A-5K can be used to make the second mold to be used to pattern concentric rings in the making of the master disk. The only difference is that in FIG. 5B the resist layer deposited on brush layer 205 is patterned into concentric bars 210 of resist. The e-beam tool patterns the resist layer so that the spaces 211 have a radial spacing that is approximately an integer multiple of $L_0$ (i.e., $nL_0$), the known bulk period for the selected BCP that will be subsequently deposited. Thus, in FIG. 5D, which is a top view, there are concentric bars 205 of polymer brush material separated by generally concentric stripes 200a. Similarly in FIG. 5J, there are concentric metal rings 213 that serve as an etch mask. Thus in FIG. 5K, substrate 200 has etched recesses 214 arranged as generally concentric rings in annular bands and can now function as the second mold to be used to pattern generally concentric rings in the making of the master disk.

Figure 5L:
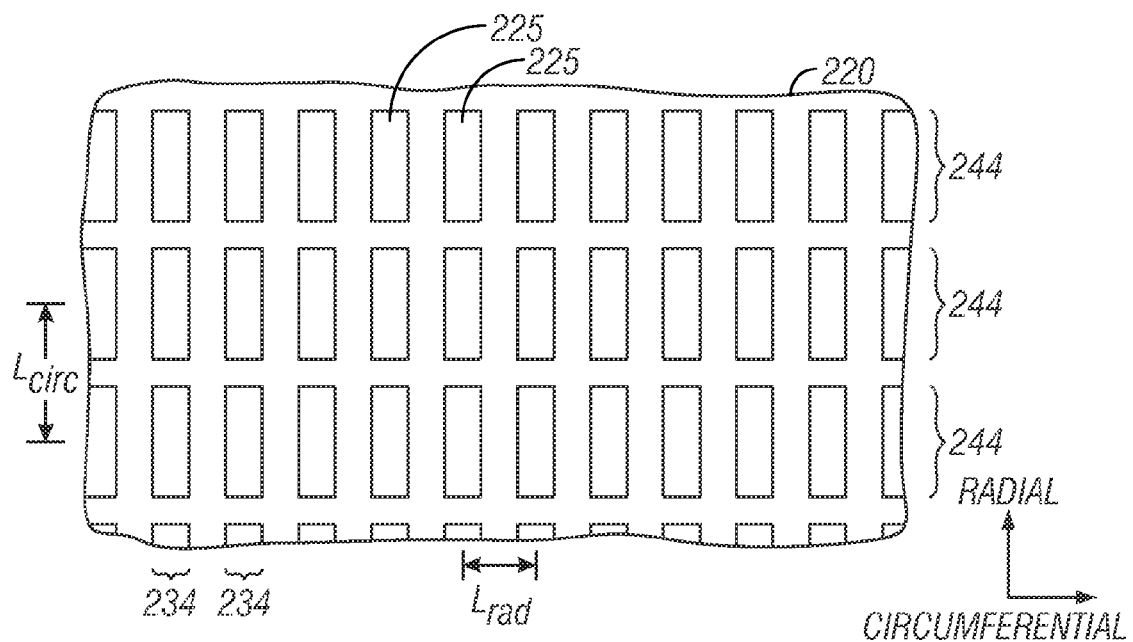
FIG. 5L is a top view of the master disk made by using two molds, each mold made with the method shown in FIGS. 5A-5K.

To make the master disk using the two molds, one with the pattern of generally radial lines and the other with the pattern of generally concentric rings, the master disk substrate is covered with a protective layer and a resist layer. The master disk substrate may be formed of any suitable material, such as, but not limited to, single-crystal Si, amorphous Si, silica, quartz, silicon nitride, carbon, tantalum, molybdenum, chromium, alumina and sapphire. The protective layer may be formed of Cr, $SiO_2$, or multilayers thereof. The first mold, for example the one with radial lines, is impressed on the resist layer, and the resulting resist pattern is used as an etch mask to etch away the protective layer not covered by the resist, leaving lines of resist and underlying protective layer corresponding to the pattern of the first mold. The remaining resist is removed by a dry or wet process. The substrate is coated again with imprint resist. The second mold, the one with concentric rings, is then impressed on the resist with the rings of the second mold intersecting the protective layer lines formed in the first pattern. The resulting resist pattern is used either as an etch mask or as a liftoff mask to form pillar-tone or hole-tone templates respectively. When used for pillar-tone, the resist pattern is used as a mask to etch away remaining portions of the protective layer not covered by the resist, leaving pillars of resist and underlying protective layer. The pillars then serve as an etch mask for an etching process that etches unprotected portions of the master disk substrate. The resulting master disk is depicted in a top view in FIG. 5L. The resulting master disk 220 then has pillars 225 in the substrate in a pattern of generally radial lines 234 and generally concentric rings 225. The patterned-media disks made with the master disk 220 will have data islands with essential the same pattern and shape as the recesses 225. In the example of FIG. 5L, the radial lines 234 have a circumferential spacing $L_{rad}$ because the BCP used to make the mold with radial lines was chosen to have a bulk period of $L_0=L_{rad}$. Similarly, the concentric rings 244 have a radial spacing $L_{circ}$ because the BCP used to make the mold with concentric rings was chosen to have a bulk period of $L_0=L_{circ}$. Thus, the patterned-media disks made with the master mold will have data islands with a BAR of $L_{circ}/L_{rad}$. The BCPs used to make the two molds can be selected with appropriate values of bulk period so as to result in disks with data islands have the desired BAR.

Figure 6A:
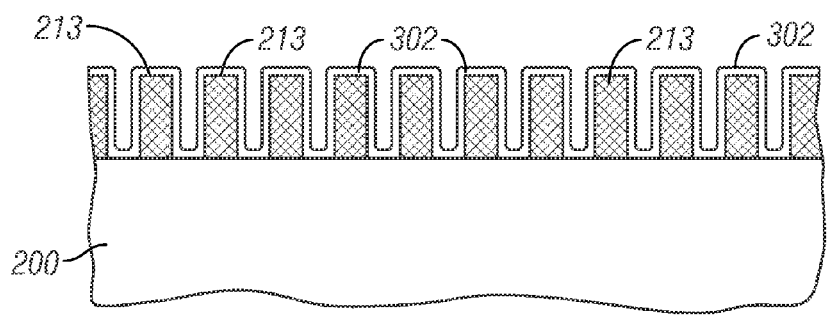
FIGS. 6A-6D are views of a small portion of one annular band of the master disk at successive stages of a second implementation of the method of making the master disk according to the present invention.

In a second implementation of the method, the master disk is made directly. The process is identical to that described above with respect to FIGS. 5A-5J. As the starting structure for this method, the metal lines 213 shown in FIG. 5J could be metal radial lines or metal concentric rings, but will be described herein as metal radial lines. Then, as shown in the sectional view of FIG. 6A, a surface modification or neutral polymer brush layer 302, like polymer brush layer 205, is applied over the structure of FIG. 5J, i.e., over the metal radial lines 213 and the regions of substrate 200 between the metal radial lines 213. Then in the top view of FIG. 6B, a layer of e-beam resist 303 is deposited over brush layer 302. The resist 303 is exposed in a rotary-stage e-beam tool and developed to expose concentric boundary regions 307. The radial width of the boundary regions 307 is selected to be approximately 0.5 $L_{circ}$, where $L_{circ}$ is the bulk period of the second BCP. The center-to-center separation between boundary regions 307 as exposed by e-beam is chosen to be $n*L_{circ}$ where n is an integer equal or greater than 1. Then the structure is subjected to an oxygen plasma to modify the neutral brush material 302 in the boundary regions 307. The resist 303 may be a positive e-beam resist like poly methyl methacrylate (PMMA) or ZEP520 from Zeon Chemicals, L.P. After developing, this will leave circumferential segments 313 with a radial width of $n*L_{circ}$ covered with resist 303, with the boundary regions 307 of modified brush layer 302 not covered with resist.

Figure 6B:
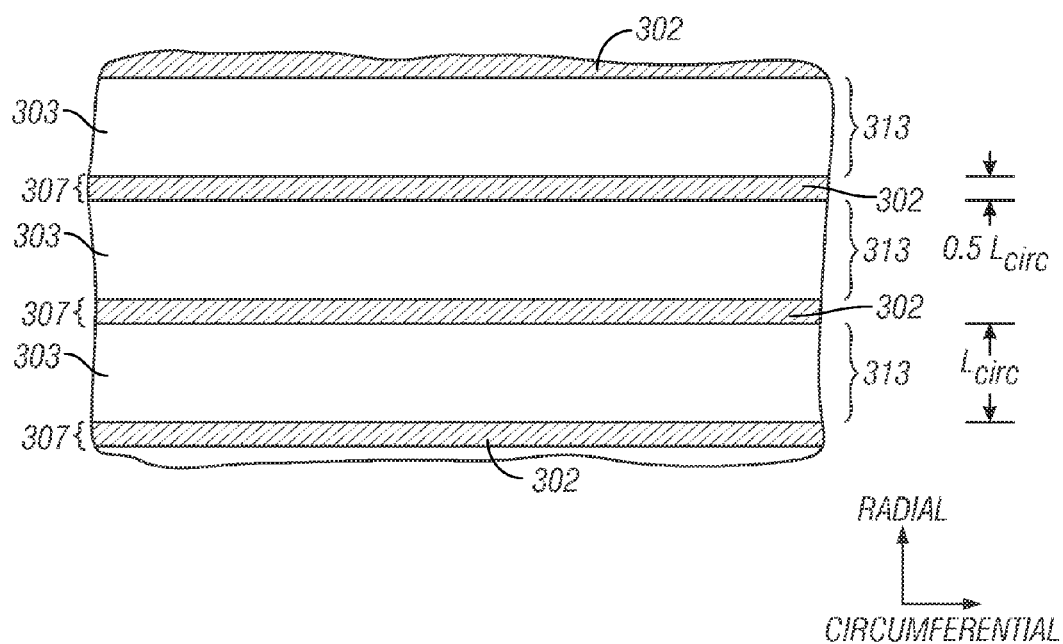
Figure 6C:
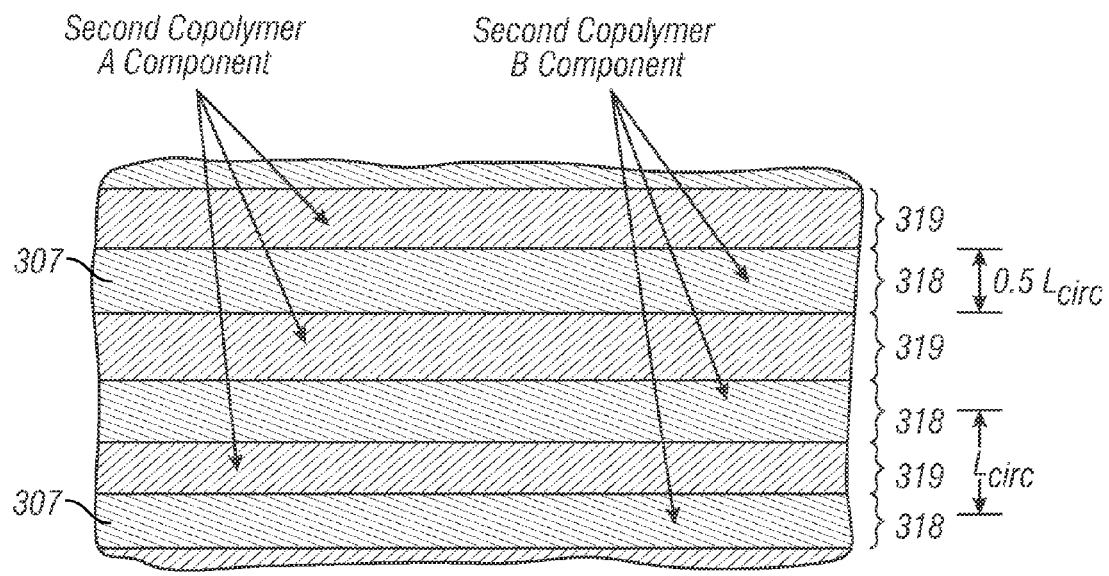
Figure 6D:
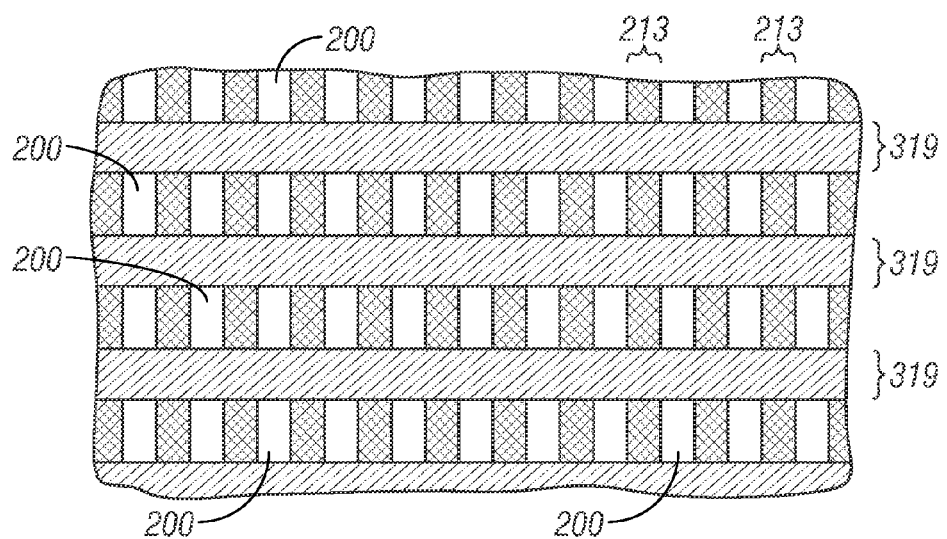

Then, in FIG. 6C, the resist has been removed and a second BCP layer has been deposited and annealed, which results in phase separation between the different components contained in the BCP. In this example, the B component (PMMA) has an affinity for the modified brush layer 302 in boundary regions 307 and thus form as generally circumferential rings 318. Because the radial width of the boundary regions 307 is approximately 0.5 $L_{circ}$, the A component (PS) form in circumferential rings 319. As a result of the self-assembly of the A and B components of the second BCP this causes the B component to also form as generally circumferential rings 318 between the A component rings 319 with radial spacing $L_{circ}$. The structure is then subjected to ultraviolet (UV) radiation and acetic acid wet develop or to a dry develop to remove the B component (PMMA) of the second copolymer in concentric rings 318, leaving concentric rings 319 of A component (PS) overlying metal radial lines 213, and exposing rectangular regions of electrically conductive substrate 200, as shown in FIG. 6D.

At this point in the process for making the master disk, there are two options. The first option makes a master disk with holes or recesses. The structure of FIG. 6D is placed in a metal plating bath and a metal, like Ni, is plated onto the exposed metal lines 213 and regions of substrate 200. The A component (PS) in concentric rings 319 is then removed by oxygen containing plasma. This leaves a grid of metal radial lines 213 and metal concentric rings where the concentric rings 318 (FIG. 6C) were located. This grid is then used as an etch mask to etch the substrate, producing a pattern of holes or recesses. The resulting master disk is then identical to the master disk shown in FIG. 5L.

The second option makes a master disk with pillars. After electroplating the radial lines and removing the remaining BCP, a protective layer such as $SiO_x$ or $SiN_x$ is deposited on top of the substrate and over the electroplated radial lines. Then, as shown in the sectional view of FIG. 6A, a surface modification or neutral polymer brush layer 302, like polymer brush layer 205, is applied over the newly deposited protective layer (not shown in FIG. 6A), i.e., over the metal radial lines 213 and the regions of substrate 200 all coated with the new protective layer. Then in the top view of FIG. 6B, a layer of e-beam resist 303 is deposited over brush layer 302. The resist 303 is exposed in a rotary-stage e-beam tool and developed to expose concentric boundary regions 307. The radial width of the boundary regions 307 is selected to be approximately 0.5 $L_{circ}$, where $L_{circ}$ is the bulk period of the second BCP. The center-to-center separation between boundary regions 307 as exposed by e-beam is chosen to be $n*L_{circ}$ where n is an integer equal or greater than 1. Then the structure is subjected to an oxygen plasma to modify the neutral brush material 302 in the boundary regions 307. The resist 303 may be a positive e-beam resist like poly methyl methacrylate (PMMA) or ZEP520 from Zeon Chemicals, L.P. After developing, this will leave circumferential segments 313 with a radial width of $n*L_{circ}$ covered with resist 303, with the boundary regions 307 of modified brush layer 302 not covered with resist, as shown in FIG. 6B. After removal of resist 303, a layer of the second BCP is deposited and annealed to form the circumferential stripes, as shown in FIG. 6C. Then, as shown in FIG. 6D, the structure is subjected to UV radiation and acetic acid wet develop or to a dry develop to remove the B component (PMMA) of the second copolymer in concentric rings 318, leaving concentric rings 319 of A component (PS) overlying metal radial lines 213 covered by the protective layer (not shown in FIG. 6D), and exposing rectangular regions of electrically conductive substrate 200 covered by protective layer (not shown in FIG. 6D). The concentric rings 319 of A component are used as a mask to etch the exposed portions of the protective layer exposing portions of the metal and conductive substrate 200. Next, the protective layer stripes covered by the remaining A-component are used as an etch mask to etch the exposed portions of metal radial lines 213. After etching, the remaining A-component stripes and remaining protective layer stripes are removed by dry or wet processes. The result is rectangular islands or pillars of the metal layer 213 that can be used as an etch mask to etch pillars into the substrate.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a mold for making a master disk for use in imprinting magnetic recording disks comprising:
   forming a pattern of stripes arranged in an annular band on a substrate having a center and a bilayer formed on its surface, wherein the lower layer of said bilayer comprises Cr;
   forming on the patterned substrate a layer of material comprising a block copolymer, the copolymer material being guided by the stripes to self-assemble into alternating first and second components of the copolymer;
   removing the second component, leaving the first component;
   electroplating a metal onto the substrate in the regions between the first component;
   removing the first component, leaving a pattern of metal;
   etching the the upper layer of said bilayer using the pattern of metal as a mask, thereby exposing portions of the lower layer;
   etching the substrate, using portions of the lower layer of said bilayer as a mask; and
   removing the lower layer of said bilayer, leaving a mold having a pattern of recesses arranged in an annular band.

2. The method of claim 1 wherein electroplating the metal comprises electroplating a material selected from nickel-phosphorus (NiP) and one or more of nickel (Ni), iron (Fe), cobalt (Co), chromium (Cr), copper (Cu), gold (Au), silver (Ag), platinum (Pt), palladium (Pd) and rhodium (Rh).

3. The method of claim 1 wherein forming on the patterned substrate a layer of material comprising a block copolymer comprises depositing a layer of block copolymer material and annealing the deposited block copolymer material to cause phase separation into said first and second components.

4. The method of claim 1 wherein the block copolymer material is a copolymer of polystyrene (PS) and poly(methyl methacrylate) (PMMA).

5. The method of claim 1 method wherein forming the pattern of stripes comprises forming a pattern of generally concentric stripes, wherein the copolymer material is guided by the stripes to self-assemble into generally concentric rings of alternating first and second components of the copolymer.

6. The method of claim 5 wherein the stripes have a radial spacing of approximately $nL_{circ}$, where n is an integer equal to or greater than 2, and the block copolymer has a bulk period $L_{circ}$, whereby the copolymer material is guided by the stripes to self-assemble into generally concentric rings of alternating first and second components of the copolymer, the concentric rings of each component having a radial spacing of approximately $L_{circ}$.

7. The method of claim 1 method wherein forming the pattern of stripes comprises forming a pattern of generally radial stripes, wherein the copolymer material is guided by the stripes to self-assemble into generally radial lines of alternating first and second components of the copolymer.

8. The method of claim 7 wherein the stripes have a circumferential spacing of approximately $nL_{rad}$, where n is an integer equal to or greater than 2, and the block copolymer has a bulk period $L_{rad}$, whereby the copolymer material is guided by the stripes to self-assemble into generally radial lines of alternating first and second components of the copolymer, the radial lines of each component having a circumferential spacing of approximately $L_{rad}$.

9. The method of claim 7 wherein the generally radial stripes have a generally arcuate shape.

10. A method for making a master disk for use in imprinting magnetic recording disks comprising:
    making a first mold comprising:
       forming on a first electrically conductive substrate having a center a pattern of generally radial stripes arranged in an annular band;
       forming on the patterned first substrate a layer of material comprising a block copolymer, the copolymer material being guided by the stripes to self-assemble into generally radial lines of alternating first and second components of the copolymer;
       removing the second component, leaving the first component;
       electroplating a metal onto the electrically conductive first substrate in the regions between the first component;
       removing the first component, leaving a pattern of metal;
       etching the first substrate, using the pattern of metal as a mask; and removing the metal, leaving a first mold having a pattern of recesses arranged in an annular band;

making a second mold comprising:
forming on a second electrically conductive substrate having a center a pattern of generally concentric stripes arranged in an annular band;

forming on the patterned second substrate a layer of material comprising a block copolymer, the copolymer material being guided by the stripes to self-assemble into generally concentric stripes of alternating first and second components of the copolymer;

removing the second component, leaving the first component;

electroplating a metal onto the electrically conductive second substrate in the regions between the first component;

removing the first component, leaving a pattern of metal;

etching the second substrate, using the pattern of metal as a mask; and removing the metal, leaving a second mold having a pattern of recesses arranged in an annular band;

forming a first layer of resist material on a master disk substrate;

imprinting the first resist material with one of said first and second molds to form first lines of first resist material on the master disk substrate;

etching the master disk substrate using said first lines as an etch mask;

removing the first resist material;

forming a second layer of resist material on the master disk substrate;

imprinting the second resist material with the other of said first and second molds to form second lines of second resist material on the master disk substrate; and etching the master disk substrate to form pillars of master disk substrate material arranged into a plurality of concentric rings and a plurality of generally radial lines arranged in an annular band.

11. A method for making a master disk for use in imprinting magnetic recording disks comprising:
forming on an electrically conductive substrate having a center a first pattern of stripes arranged in an annular band;

forming on the patterned substrate a layer of material comprising a first block copolymer, the first block copolymer material being guided by the first pattern of stripes to self-assemble into alternating first and second lines of components of the first copolymer;

removing the lines of second component of the first copolymer, leaving lines of the first component of the first copolymer;

electroplating a metal onto the electrically conductive substrate in the regions between the lines of the first component of the first copolymer;

removing the lines of the first component of the first copolymer, leaving a pattern of metal lines;

depositing on the substrate and the pattern of metal lines a layer of polymer brush material;

forming over the polymer brush material a resist pattern of bars;

modifying the polymer brush material unprotected by the resist bars;

removing the resist, leaving a second pattern of stripes of modified polymer brush material;

depositing a layer of said second block copolymer material on the substrate, the pattern of metal lines and the second pattern of stripes of modified polymer brush material, the second block copolymer material being guided by the second pattern of stripes of modified polymer brush material to self-assemble into alternating first and second lines of components of the second copolymer; and removing the lines of the second component of the second copolymer, leaving a pattern of lines of first component of the second copolymer overlying the metal lines.

12. The method of claim 11 wherein the electrically-conductive substrate comprises doped silicon.

13. The method of claim 11 wherein the doped silicon has an oxide layer on its surface, and further comprising, prior to electroplating the metal, removing the oxide layer.

14. The method of claim 11 wherein the first block copolymer material is a copolymer of polystyrene (PS) and poly (methyl methacrylate) (PMMA).

15. The method of claim 11 wherein each of the first and second block copolymer materials is a diblock copolymer material of polystyrene (PS) first component and poly(methyl methacrylate) (PMMA) second component, and wherein the molecular weight of the first copolymer material is different from the molecular weight of the second block copolymer material.

16. The method of claim 11 further comprising:
electroplating a metal onto the metal lines and the electrically conductive substrate in the regions between the metal lines;

removing the first component of the second copolymer, leaving a grid of intersecting metal lines;

etching the substrate, using the grid of intersecting metal lines as a mask; and removing the metal lines, leaving a master disk having a pattern of recesses arranged in an annular band.

17. The method of claim 16 wherein the electrically-conductive substrate comprises a substrate having a bilayer formed on its surface, wherein the lower layer of said bilayer comprises Cr, and wherein etching the substrate comprises etching the upper layer of said bilayer using the pattern of metal lines as a mask; removing the metal lines; etching the lower layer of said bilayer using the upper layer of said bilayer as a mask; removing the upper layer of said bilayer; and etching the substrate using the lower layer of said bilayer as a hard mask.

18. The method of claim 11 further comprising:
etching the metal lines not protected by the lines of first component of the second copolymer;

removing the lines of first component of the second copolymer, leaving a pattern of metal pillars on the substrate;

etching the substrate, using the metal pillars as a mask; and removing the metal pillars, leaving a master disk having a pattern of pillars arranged in an annular band.

19. The method of claim 18 wherein the electrically-conductive substrate comprises a substrate having a bilayer formed on its surface, wherein the lower layer of said bilayer comprises Cr, and wherein etching the substrate comprises etching the upper layer of said bilayer using the pattern of metal pillars as a mask; removing the metal pillars; etching the lower layer of said bilayer using the upper layer of said bilayer as a mask; removing the upper layer of said bilayer; and etching the substrate using the lower layer of said bilayer as a hard mask.

20. The method of claim 11 wherein forming the first pattern of stripes comprises forming a pattern of generally radial stripes, wherein the first copolymer material is guided by the generally radial stripes to self-assemble into generally radial lines of alternating first and second components of the first copolymer; and wherein said second pattern of stripes of modified polymer brush material comprises a pattern of generally concentric stripes, wherein the second block copolymer material is guided by the pattern of generally concentric stripes to self-assemble into alternating first and second generally concentric rings of components of the second copolymer.

21. The method of claim 20 wherein the first block copolymer has a bulk period $L_0=L_{rad}$ and the generally radial stripes have a circumferential spacing of approximately $nL_{rad}$, where n is an integer equal to or greater than 2, the first copolymer material being guided by the generally radial stripes to self-assemble into generally radial lines of alternating first and second components of the first copolymer, the radial lines of each component of the first copolymer having a circumferential spacing of approximately $L_{rad}$; and wherein the second block copolymer has a bulk period $L_0=L_{circ}$ and the generally concentric stripes have a radial spacing of approximately $nL_{circ}$, where n is an integer equal to or greater than 2, the second copolymer material being guided by the generally concentric stripes to self-assemble into generally concentric rings of alternating first and second components of the first copolymer, the concentric rings of each component of the second copolymer having a radial spacing of approximately $L_{circ}$.

22. The method of claim 20 wherein the generally radial stripes have a generally arcuate shape.

* * * * *